(12) United States Patent
Burton et al.

(10) Patent No.: US 6,928,521 B1
(45) Date of Patent: Aug. 9, 2005

(54) METHOD, SYSTEM, AND DATA STRUCTURES FOR USING METADATA IN UPDATING DATA IN A STORAGE DEVICE

(75) Inventors: David Alan Burton, Vail, AZ (US); Norio Fujita, Shiga-Ken (JP); Robert Louis Morton, Tucson, AZ (US); Koji Nakase, Kanagawa (JP)

(73) Assignee: International Business Machines Corporation, Armonk, NY (US)

(*) Notice: Subject to any disclaimer, the term of this patent is extended or adjusted under 35 U.S.C. 154(b) by 692 days.

(21) Appl. No.: 09/630,228

(22) Filed: Aug. 1, 2000

(51) Int. Cl.$^7$ .......................................... G06F 12/00
(52) U.S. Cl. ........................ 711/144; 711/145; 711/114
(58) Field of Search ........................ 711/154, 156, 113, 711/114, 141–145; 714/14, 21, 52, 54, 42

(56) References Cited

U.S. PATENT DOCUMENTS

| | | | |
|---|---|---|---|
| 4,530,054 A | | 7/1985 | Hamstra et al. |
| 4,637,024 A | | 1/1987 | Dixon et al. |
| 4,901,228 A | | 2/1990 | Kodama |
| 5,008,813 A | | 4/1991 | Crane et al. |
| 5,155,835 A | * | 10/1992 | Belsan ........................ 711/114 |
| 5,283,876 A | | 2/1994 | Tague |
| 5,403,639 A | * | 4/1995 | Belsan et al. ................ 707/204 |
| 5,533,189 A | * | 7/1996 | Cheong et al. ................. 714/6 |
| 5,548,711 A | * | 8/1996 | Brant et al. ..................... 714/5 |
| 5,603,008 A | | 2/1997 | Hilton et al. |
| 5,608,891 A | | 3/1997 | Mizuno et al. |
| 5,696,937 A | * | 12/1997 | White et al. ................. 711/142 |
| 5,748,873 A | | 5/1998 | Ohguro et al. |
| 5,749,091 A | | 5/1998 | Ishida et al. |
| 5,749,094 A | | 5/1998 | Jaggar |
| 5,761,705 A | * | 6/1998 | DeKoning et al. ........... 711/113 |
| 5,909,540 A | | 6/1999 | Carter et al. |
| 6,021,482 A | * | 2/2000 | Wu et al. ..................... 711/217 |
| 2001/0025360 A1 | * | 9/2001 | Kakuta et al. ............... 714/769 |

FOREIGN PATENT DOCUMENTS

| | | |
|---|---|---|
| JP | 2037446 | 2/1990 |
| JP | 10124389 | 5/1998 |

* cited by examiner

OTHER PUBLICATIONS

IBM Technical Disclosure Bulletin, "Profiling Technique for Memory References Within Individual Pages on Paging-Based Virtual Memory Systems", vol. 35, No. 3, Aug. 1992, pp. 320-325.

*Primary Examiner*—Matthew D. Anderson
(74) *Attorney, Agent, or Firm*—David W. Victor; Konrad Raynes & Victor LLP

(57) ABSTRACT

Disclosed is a method, system, and data structures for updating data in a storage device. An update to one or more blocks of customer data at addresses in the storage device is received. For each block of data to update, metadata is generated indicating the address of the block in the storage device and an error checking code that is capable of being used to determine whether the customer data in the block has changed. For each block of data to update, the block of data to update and the metadata for the block are written to cache. Further, for each block of data to update, the block of data and the metadata are transferred for the block from the cache to the storage device. The metadata may be used during power loss and recovery.

44 Claims, 9 Drawing Sheets

| Hardware Control Block | |
|---|---|
| Byte | Field |
| 0-5<br>  0 - 1<br>  2 - 5 | Target PA<br>Disk ID<br>LBA |
| 6-7 | Reserved for processor. |
| 8-23 | Reserved for I/O Manager. |
| 24-25<br>  Bits 0 - 9<br><br>  Bit 10<br><br>  Bit 11<br><br><br><br><br>  Bit 12<br>  Bit 13<br><br><br><br>  Bits 14 - 15 | Controls<br>Reserved<br><br>Recalculate LRC after Target PA is added and add LRC.<br><br>Add target PA; use the target PA. The LBA is used for the first transferred sector. Increment the LBA for subsequent transferred sector.<br><br>Check LRC.<br>Check PA. Use the source PA. LBA must match first transferred sector. Increment the LBA for subsequent transferred sector.<br><br>Address Conversion:<br>00 - 512 cache to 512 host.<br>01 - 512 host to 520 cache.<br>10 - 520 cache to 512 disk.<br>11 - 520 cache/disk. |
| 26-31<br>  26-27<br>  28-31 | Source PA<br>Disk ID<br>LBA |

FIG. 2

| ADDRESS FORMAT | |
|---|---|
| Bit Offset | Field Description |
| 63 | Reserved |
| 62 | Hardware Control Block enabled (0 - do not use HCB; 1 - use HCB index). |
| 61-64 | Hardware Control Block Index. |
| 43-33 | Reserved |
| 32-0 | Memory Address |

FIG. 3

METHOD, SYSTEM, AND DATA STRUCTURES FOR USING METADATA IN UPDATING DATA IN A STORAGE DEVICE

CROSS-REFERENCE TO RELATED APPLICATIONS

This application is related to the following co-pending and commonly-assigned patent application entitled "Method, System, And Data Structures For Transferring Blocks of Data From a Storage Device to a Requesting Application" to Robert L. Morton, David A. Burton, Koji Nakase, and Norio Fujita, having U.S. application Ser. No. 09/628,394, which is filed on the same date herewith and all of which is incorporated herein by reference in its entirety.

BACKGROUND OF THE INVENTION

1. Field of the Invention

The present invention relates to a system, method, and program for using metadata to update data in a storage device.

2. Description of the Related Art

A cache fast write operation involves an application writing data to a storage controller cache. The write operation from the host end completes after the data is written to cache. This allows the host to immediately proceed to further operations without having to wait for the storage controller to physically copy the update to the storage device, and further wait for the delays at the storage device. The storage controller will at some later point schedule a destage operation to destage updates previously written to cache by the application programs. To protect the updates written to cache from failure events, such as a power loss, systems have designed battery backed up cache memories, which comprise a fast, volatile memory chip that is backed-up by a battery to function as a non-volatile memory. Such otherwise volatile memories, such as RAMs and SIMMs, that are battery backed-up are referred to as a non-volatile storage units (NVS).

To maintain data in cache, the storage controller generates cache control blocks including information describing the blocks of sectors in cache. The storage controller uses these control blocks when accessing data in cache, determining what tracks in cache to destage, and where to write new updates. The cache control blocks would include such information as a cache directory of the disk identifier and logical block address (LBA) of each sector from the disk in cache, state flags, active command counters, references to valid and modified sector bitmaps, and list linkage pointers for the hash and least recently used (LRU) lists used for determining which sectors in cache to destage. One problem with maintaining the control blocks in NVS cache is that the control blocks consume significant space that could otherwise be used for customer data.

Thus, there is a need in the art to provide an improved technique for managing data in cache that maximizes the amount of customer data maintained in the NVS cache. Still further, there is a need to maintain sufficient control information for data in cache to ensure that data being transferred from a disk or cache during a read/write operation has not been corrupted or inadvertently altered by another process. Moreover, there is a need to maintain sufficient control information on the content of the NVS so that any updates cached in the NVS cache can be recovered from the NVS cache in the event of a power loss.

SUMMARY OF THE PREFERRED EMBODIMENTS

To provide an improved cache management system, preferred embodiments disclose a method, system, program, and data structures for updating data in a storage device. An update to one or more blocks of customer data at addresses in the storage device is received. For each block of data to update, metadata is generated indicating the address of the block in the storage device and an error checking code that is capable of being used to determine whether the customer data in the block has changed. For each block of data to update, the block of data to update and the metadata for the block are written to cache. Further, for each block of data to update, the block of data and the metadata are transferred for the block from the cache to the storage device.

In further embodiments, the error checking code is further capable of being used to determine whether the metadata in the block has changed.

In still further embodiments, for each block of data to update, a determination is made as to whether the address of the block of data in the metadata and the address in the storage device to update match. Further, for each block of data to update, an operation is performed on the customer data in the block and the error checking code to determine whether the customer data has changed. The block of data to update and metadata for the block is transferred to the storage device if the address of the block in the metadata and requested address match and the customer data has not changed.

In still further embodiments, the steps of generating the metadata and determining whether the address of the block in the storage device and block address in metadata match, performing the operation on the customer data, and error checking is performed by a device that is separate from a main processor. In such case, the device transfers the block of data from the cache to the storage device using a direct memory access (DMA) channel.

Yet further, when recovering from a power loss, the metadata for blocks in cache may be used to rebuild cache control blocks for the blocks in cache.

Preferred embodiments provide a method for generating metadata with updates to blocks of data in a storage device to store with the updates in cache. This metadata may then be used to ensure that the customer data has not inadvertently been modified while in cache and that the update is written to the correct location in the storage device. Further, with preferred embodiments the metadata is primarily managed from a device that is separate from the main processor of the storage controller, thereby relieving the storage controller main processor from being involved with the data transfers and maintenance and use of metadata.

Still further, the metadata may be used to rebuild cache control blocks in the event of a power loss and recovery. In preferred embodiments, the customer data and metadata are maintained in a non-volatile portion of cache and the cache control blocks are maintained in a volatile portion of cache in order to maximize the non-volatile cache space available for customer data. In the event of a power loss, the metadata can then be used to rebuild the cache control blocks in volatile memory.

BRIEF DESCRIPTION OF THE DRAWINGS

Referring now to the drawings in which like reference numbers represent corresponding parts throughout:

FIGS. 2 and 3 illustrates data structures used to perform input/output (I/O) operations with respect to a storage device in accordance with preferred embodiments of the present invention;

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
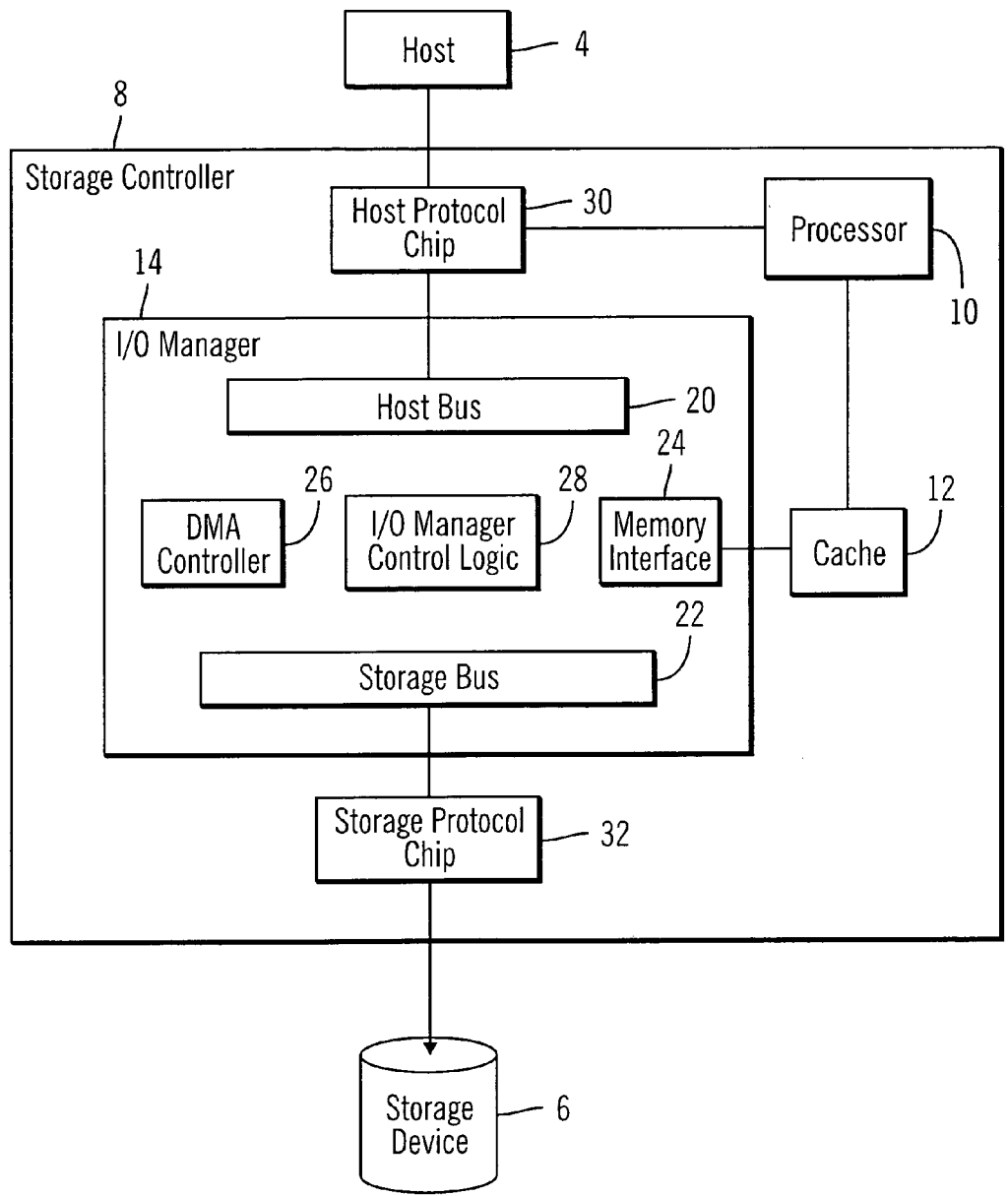
FIG. 1 is a block diagram illustrating a computing environment in which preferred embodiments are implemented.

FIG. 1 illustrates a computing environment in which preferred embodiments are implemented. A host 4 may comprise any computing device known in the art, including servers through which other client computers can access storage or clients. The host 4 includes at least one adaptor, such as a Fibre Channel or Small Computer System Interface (SCSI) adaptor card or any other network adaptor card known in the art. The host adaptors allow the host to communicate with a storage device 6 via a storage controller 8. The storage device 6 may comprise a DASD or any other non-volatile storage device and system known in the art, including hard disk drives, tape storage, optical disks, etc. The storage controller 8 may comprise any control unit, storage controller, etc., that manages the transfer of data from an I/O device, such as storage device 6, and one or more hosts.

In preferred embodiments, the storage controller 8 controller includes a main processor 10, a cache 12, and an I/O manager 14. In preferred embodiments, the I/O manager 14 comprises a separate integrated circuit device that manages the transfer of data between the storage device 6 and host 4. In preferred embodiments, data is transferred among the host 4, cache 12, and storage device 6 via the I/O manager 14 without requiring the processor 10 to be involved in the data movement operations. In this way, the processor 10 is relieved of having to directly manage the data transfer operations, thereby improving overall storage controller 8 performance. This arrangement relieves the main processor 10 from the otherwise substantially burdensome activity of directly controlling the transfer of data and updating the metadata in cache after transferring data.

The I/O manager 14 includes a host bus 20 for interfacing with host 4 systems; a storage bus 22 for interfacing with the storage device 6; a memory interface 24 for interfacing with the cache 12; a Direct Memory Access (DMA) controller 26 to manage DMA channels providing direct communication from the cache 12 to the storage device 6 that entirely bypasses the main processor 10 of the storage controller 8; and an I/O manager control logic 28 to perform the various I/O manager 14 operations, including logic to transfer data among the cache 12, host 4 and storage device 6, logic to XOR data as part of longitudinal redundancy error checking (LRC), and formatting sectors of data. The DMA controller 26 in the I/O manager 14 is used to access data in the cache 12 and provide the data to an XOR engine to perform the error checking and generate the LRC error checking code.

A host protocol chip 30 provides for the data transfer protocol processing, such as SCSI or Fibre Channel protocol, to move data between the I/O manager 14 and host 4. A storage protocol chip 32 provides for data transfer protocol processing between the I/O manager 14 and the storage device 6. The host 30 and storage 32 protocol chips would each include a DMA controller to transfer data along DMA channels between the host 4 and cache 12 and cache 12 and storage 6 without involving the storage controller 8 main processor 10.

In preferred embodiments, the processor 10, cache 12, I/O manager 14, and protocol chips 30 and 32 are all on the same controller card or board. In alternative embodiments, any one or more of these components may be on separate cards all within the storage controller 8.

In preferred embodiments, the I/O manager 14 encodes sectors of data being transferred among the host 4, storage device 6, and cache 12 with an eight byte physical address identifying the volume and logical block address (LBA) of the sector and a two byte LRC code formed by XORing the customer data and physical address (PA) in the sector. The physical address (PA) may comprise a logical address that is further processed to obtain the physical location of the data. In preferred embodiments, each data sector or sector of customer data comprises 512 bytes. Thus, the format of the data sector maintained by the I/O manager 14 may be as follows: bytes 0–511 include the customer data; bytes 512–517 include the physical address of the sector in the storage device 6; and bytes 518–519 includes the LRC code.

In the described embodiments, data from the host 4 being written to the storage device 6 is first placed in cache 12. In this way, the host 4 does not have to wait for the storage controller 8 to complete the update to the storage device 6 in order to proceed as the updates are applied to cache 12 and then later destaged to the storage device 6. Thus, the performance of the host 4 update is not dependent on the speed of the storage device 6 and storage controller 8. Data being read by the host 4 from the storage device 6 is also placed in cache 12 to allow subsequent requests to the same data to be serviced from cache 12, which is faster than returning data from the storage device 6.

For a Flash Copy operation, if writing to a source sector having data that has not yet been copied to the target, the source sector subject to the update must first be copied to the corresponding target sectors before overwriting the source data. Similarly, if reading a target sector that has not been updated with the source data, the storage controller 8 must provide the source data before reading the target data.

The physical address (PA) and LRC fields in the 520 byte sector are generated by the I/O manager 14 when the updates are written into cache 12 from the host 4 or when the sector in the storage device 6 staged into cache 12 does not include the eight bytes of metadata. In certain embodiments, the eight bytes of metadata may be stored with the sector written to the storage device 6. The I/O manager 14 checks the physical address and LRC fields in the eight bytes of metadata whenever data is staged into cache, transferred from cache to the host 4, and transferred from the host to cache 12.

To initialize a data transfer operation, the processor 10 would first set-up a hardware control block in the cache 12 for the I/O manager to use 14 when determining how to process data transferring among the host 4, storage device 6, and cache 12. FIG. 2 illustrates the fields in the hardware control block 50. The bytes for the target physical address (PA) (bytes 0–5) and source physical address (PA) (bytes 26–31) are both used if the operation is to read data from a target sector or write data to a source or target sector(s) involved in a Flash Copy relationship when the source data has not yet been copied over to the target data, as indicated in the bitmap discussed above. In such case, the source sector must be copied to the cache 12 as the target sector. The physical address (PA) of the source and target sectors involved in the operation are maintained in the target PA and source PA fields in the hardware control block. If the operation is a write, then target physical address (PA), bytes 0–5, is used when the update is read from the host 4 and written to the cache 12. The source physical address (PA) (bytes 26–31) is used when the update is read from the cache 12 and then written to the storage device 6. For a non-Flash Copy read operation, the source physical address is used (PA) for both the transfer from the storage device 6 to cache 12 and from the cache 12 to the host 4. However, if sectors in the storage device 6 are in a 512 byte format, then the target physical address is used when staging the sector from the storage device 6 to the cache 12, and the target physical address is used to transfer the data from the cache 12 to the host.

The controls field (bytes 24–25) provide bits that the processor 10 sets to instruct the I/O manager 14 on how to process data being transferred among the host 4, storage device 6, and cache 12. Bits 10, 11, 12, and 13 are set when there is a Flash Copy relationship between source and target sectors. If the host 4 is trying to read a target sector involved in a Flash Copy relationship that has not yet been updated with the source sector, then the I/O manager copies the data from the source sector into cache. The I/O manager 14 checks the source physical address (PA) in the metadata of the sector staged into cache with the source physical address (PA) in the hardware control block (HCB). The I/O manager 14 would further perform an LRC XOR operation on the 518 sector bytes, including the 512 bytes of customer data and six byte physical address, staged into cache, and check with the two byte LRC code in the metadata. The related, co-pending patent application entitled "Method, System, And Data Structures For Transferring Blocks of Data From a Storage Device to Requesting Application," which was incorporated by reference above, provides further details for initializing the hardware control block (HCB) for Flash Copy and other read operations.

Bits 14–15 indicate the number of bytes in the sector in cache and the storage device.

"00" indicates that 512 bytes are transferred from cache 12 to the host 4, with no formatting changes. In this case, no metadata is maintained with the 512 byte sector in cache 12.

"01" indicates that a 512 byte sector from the host 4 is converted to a 520 byte sector in cache 12, where eight bytes include the metadata, i.e., physical address and LRC code for the 512 bytes of data.

"10" indicates that a 520 byte sector from the cache 12 is converted to a 512 byte sector for the disk or storage device 6, thereby stripping the sector of the metadata in cache before storing on disk. In this case, the disk does not maintain the metadata.

"11" indicates that a 520 byte sector in cache 12 is to be sent without conversion to the storage device 6 as the storage device maintains the eight bytes of metadata.

The processor 10 also sets-up fields in a DMA address 60 having the address format shown in FIG. 3 to provide information on how to transfer updates from the host 4 to the cache 12, and from the cache 12 to the storage device 6. This DMA address 60 is used by the host protocol chip 30 to DMA sectors from the host 4 into cache 12 and by the storage protocol chip 32 to DMA sectors from the cache 12 to the storage device 6. The hardware control block (HCB) enabled field (bit 62) indicates whether to use the hardware control block (HCB) index in memory; the hardware control block index (bits 61–64) references the hardware control blocks in memory; and the memory address in cache 12 (bits 32–0) indicates where to store the first sector of the data update from the host 4.

Figure 4:
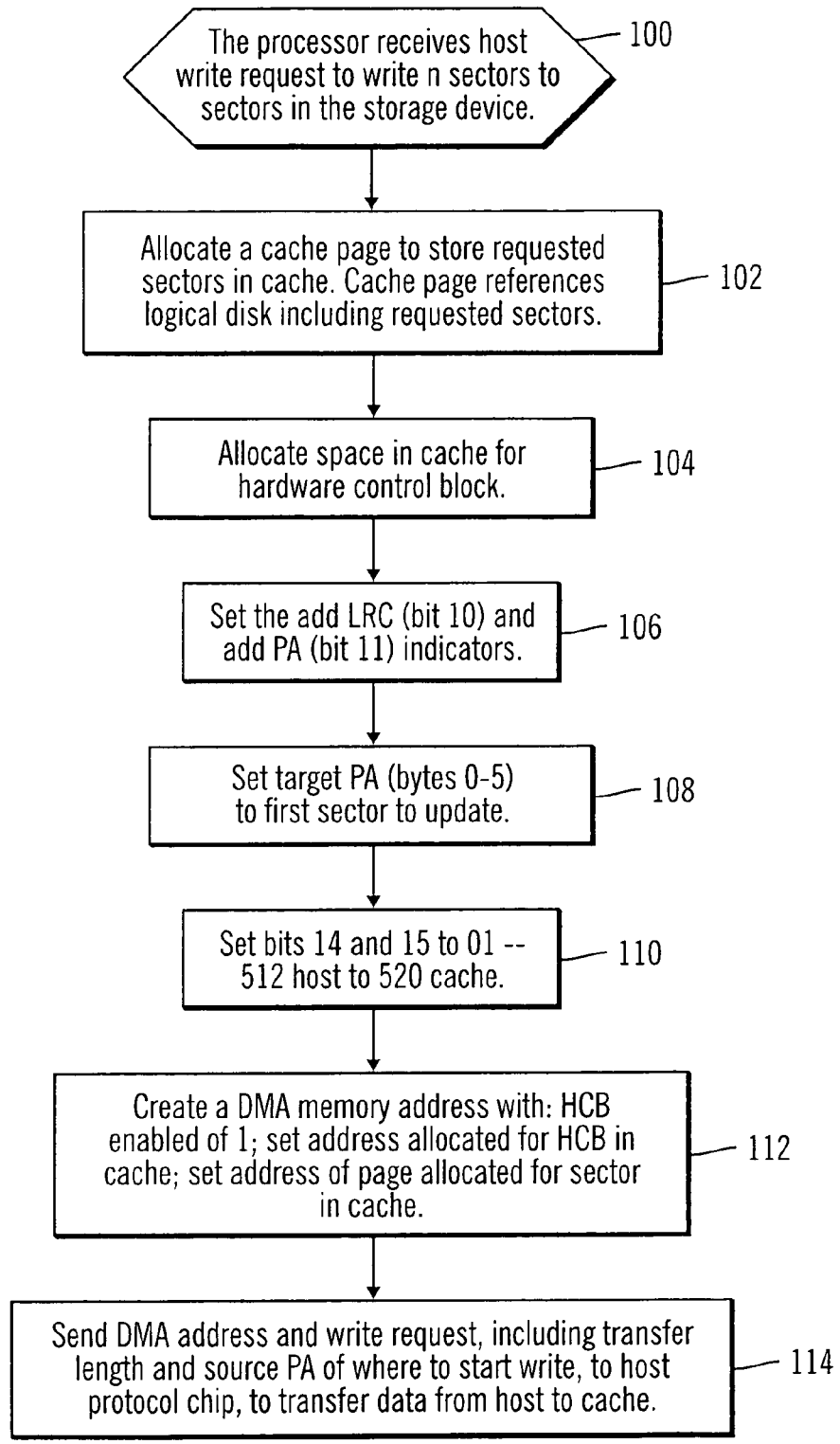
FIG. 4 illustrate logic to set-up a hardware control block to facilitate the data update in accordance with preferred embodiments of the present invention.

FIG. 4 illustrates logic implemented in the firmware or software of the processor 10 to set-up the hardware control block (HCB) of FIG. 2 in cache 12 and the fields in the DMA address of FIG. 3 for a write request received by the host protocol chip 30 from the host 4 at block 100. In preferred embodiments, the host protocol chip 30 would send the write request, such as a SCSI write request, to the processor 10 to initially process. In response to the write request, the processor 10 allocates (at block 102) a page in cache 12 to store the updated sector(s). This cache page references the logical disk including the requested sectors. The processor 10 further allocates (at block 104) a hardware control block (HCB) for the n sectors to update in the storage device 6. Because the sectors received from the host comprise 512 bytes of customer data, i.e., no metadata, the processor 10 sets (at block 106) the add LRC (bit 10) to "on" to add the LRC code to the metadata and the add physical address (PA) (bit 11) to "on" to add the target physical address of where to write the sector i to the storage device 6. FIG. 3 shows that bit 11 is for adding the target PA, which is also used for Flash Copy operations as discussed in the related patent application Ser. No. 09/628,394 "Method, System, And Data Structures For Transferring Blocks of Data From a Storage Device to Requesting Application,". In the context of update operations, bit 11 is used to indicate whether to add the target physical address to the metadata or the location in the storage device to update.

The processor 10 further sets (at block 108) the target physical address (PA) at bytes 0–5 to the first sector i in the write operation, which is specified in the SCSI write command. Bits 14–15 are set (at block 110) to "01" to indicate that the 512 byte sector from the host is transformed to a 520 byte sector, including the eight bytes of metadata, in the cache 12.

The processor 10 then creates (at block 112) a DMA memory address 60 with the hardware control block (HCB) enabled bit "on", the hardware control block index providing an index into the hardware control block (HCB) in cache 12, and the memory address in cache 12 where the first sector of the update is written in cache 12. The processor 10 then transfers (at block 114) the DMA address and the SCSI write request including the source physical address (PA) as the start of the write operation having a transfer length equal to the number of requested sectors to the host protocol chip 30 to use to DMA the requested sectors into cache 12. Note that because the cache 12 stores 520 byte sectors including the eight bytes of metadata, the LBA size of sectors in the cache 12 is 520 bytes.

Figure 5:
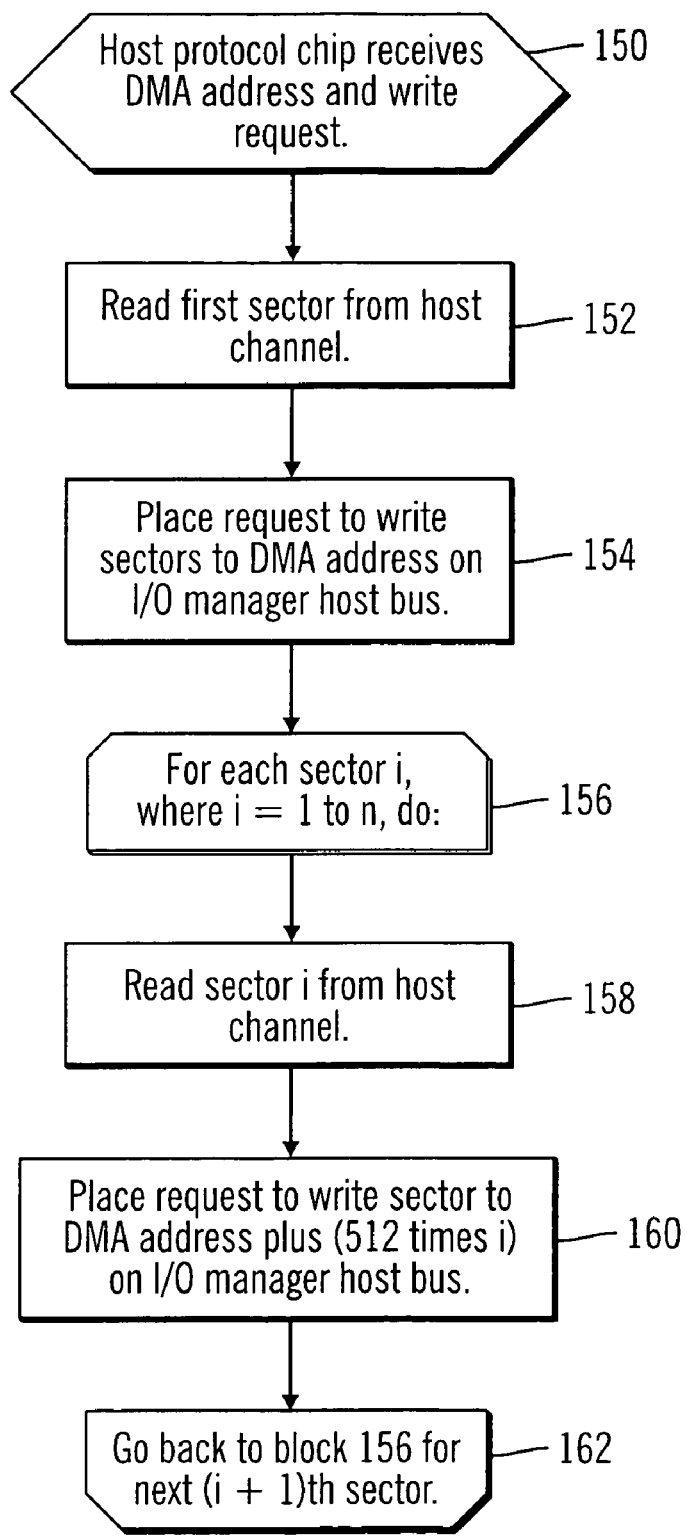
FIG. 5 illustrates logic to ready the transfer of the update to cache in accordance with preferred embodiments of the present invention.

FIG. 5 illustrates logic implemented in the host protocol chip 30 to DMA the updated sector(s) into cache 12. At block 150, the host protocol chip 30 receives the DMA address and SCSI write request to write n sectors or logical blocks from the source physical address (PA), where n is equal to the transfer length of the write request. The host protocol chip 30 then reads (at block 152) and places the write request to the DMA memory address (bits 32–0) in the DMA address 60 on the I/O manager host bus 20. The host protocol chip 30 then performs a loop at blocks 156 to 162 for each sector i, for sectors 1 to n, i.e., from the second to last sector in the write operation. Within the loop, the host protocol chip 30 reads (at block 158) sector i from the host 4 channel and places (at block 160) a write request on the host bus 20 to write sector i to the location in the cache 12 at the memory address (bits 32–0) plus 512 bytes times i, which is the offset from the first sector written to cache 12 where sector i is cached 12. This offset location in cache 12 of where to write sector i is placed in the memory address bits 0–32 of the DMA address 60, which is then used by the I/O manager 14 when writing the data to cache 12.

Figure 6:
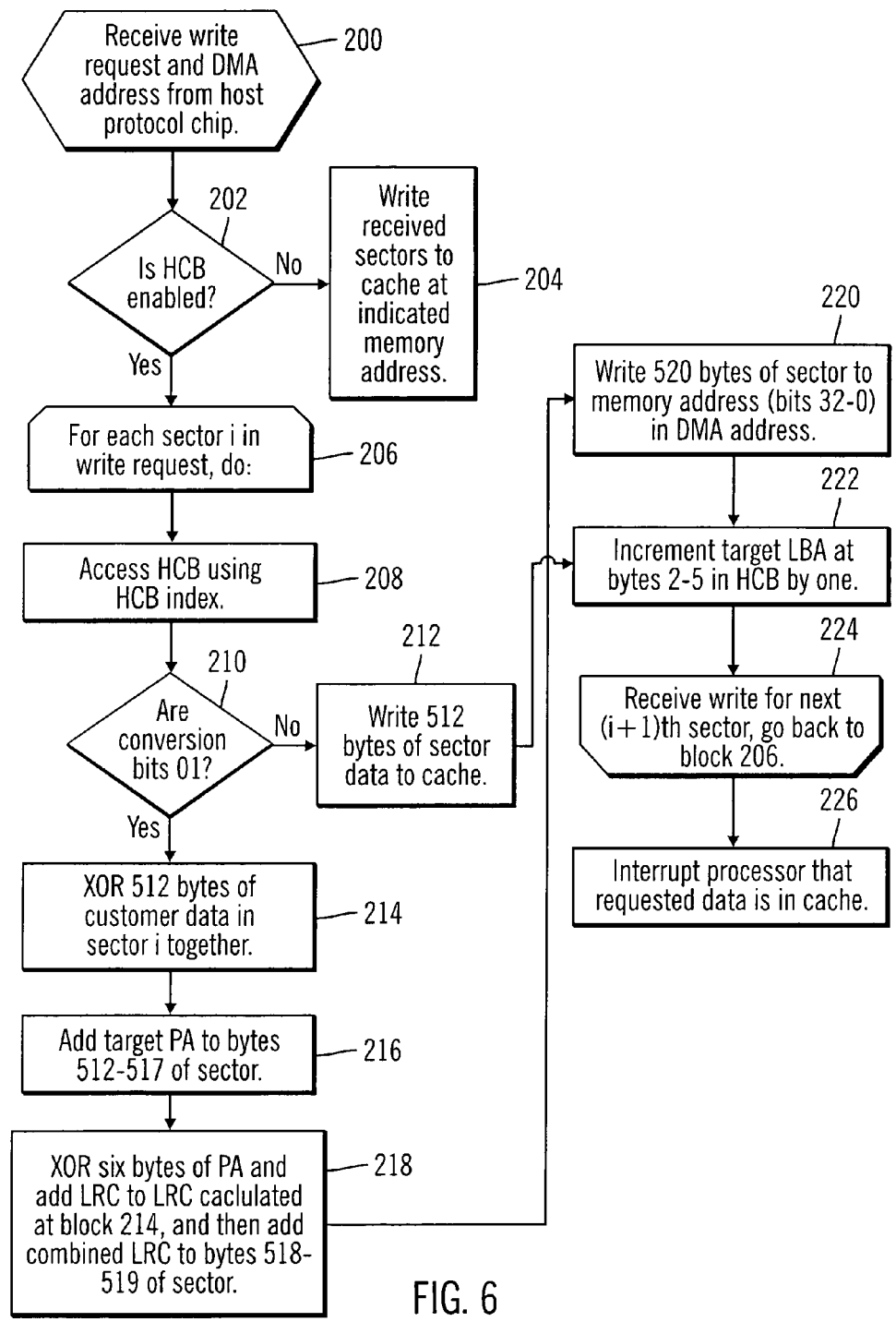
FIG. 6 illustrates logic to use the hardware control block set-up in FIG. 4 to write the update to the cache in accordance with preferred embodiments of the present invention.

FIG. 6 illustrates logic implemented in the I/O manager control logic 28 to process a write request from the storage protocol chip 32 to write the sectors read from the host 4 channel to the memory address in cache 12 that the host protocol chip 30 specifies. The transfer length of the write request would comprise the number of requested sectors. Upon receiving the write request including the DMA address (at block 200), the I/O manager 14 would determine (at block 202) whether the hardware control block (HCB) is enabled. If not, then the I/O manager 14 would write (at block 204) the received sectors to the cache 12 starting at the DMA address specified in the write request. Otherwise, the I/O manager 14 would start a loop between blocks 206 and 224 for each sector received from the host protocol chip 30 to write to cache 12. Within this loop, at block 208, the I/O manager 14 accesses the hardware control block (HCB) using the hardware control block (HCB) index in the DMA address. If (at block 210) the conversion format bits are not "01", indicating that the cache 12 does not store a 520 byte sector including metadata, then the I/O manager 14 writes (at block 212) the 512 byte sector to cache 12. Otherwise, if the conversion format bits are "01", i.e., a conversion from 512 bytes from the host 4 to 520 bytes in cache 12, then the I/O manager 14 must generate the target physical address (PA) and LRC code for the metadata to add to the customer data stored in cache 12. The add LRC (bit 10) and physical address (PA) (bit 11) instruct the I/O manager 14 to XOR (at block 214) the 512 bytes of customer data, add (at block 216) the target physical address (PA) as identified at bytes 0–5 in the hardware control block (HCB) as bytes 512 to 517 in the sector, and then XOR (at block 218) the six bytes of the physical address (PA) and add this to the LRC calculated at block 214. The residual LRC is then added to bytes 518 and 519 of the sector. The I/O manager 14 then writes (at block 220) the 520 bytes of the sector to the memory location indicated in the DMA memory address at bits 0–32.

The I/O manager 14 then increments (at block 222) the LBA bytes 2–5 in the target physical address (PA) of the hardware control block (HCB) for the next (i+1)th sector to write into cache. In this way, the processor 10 only has to set up the hardware control block (HCB) once for a host request of contiguous blocks and the I/O manager 14 increments the LBA bytes after processing one sector in the contiguous sectors requested by the host 4. If there are further sectors in the requested sectors to consider, then (at block 224), the I/O manager 14 proceeds back to block 206 to consider the next (i+1)th contiguous sector the host 4 is updating. After writing all the 520 byte requested contiguous sectors to the cache 12, the I/O manager 14 then signals (at block 226) the processor 10 that all the updated sectors have been written to cache 12.

Figure 7:
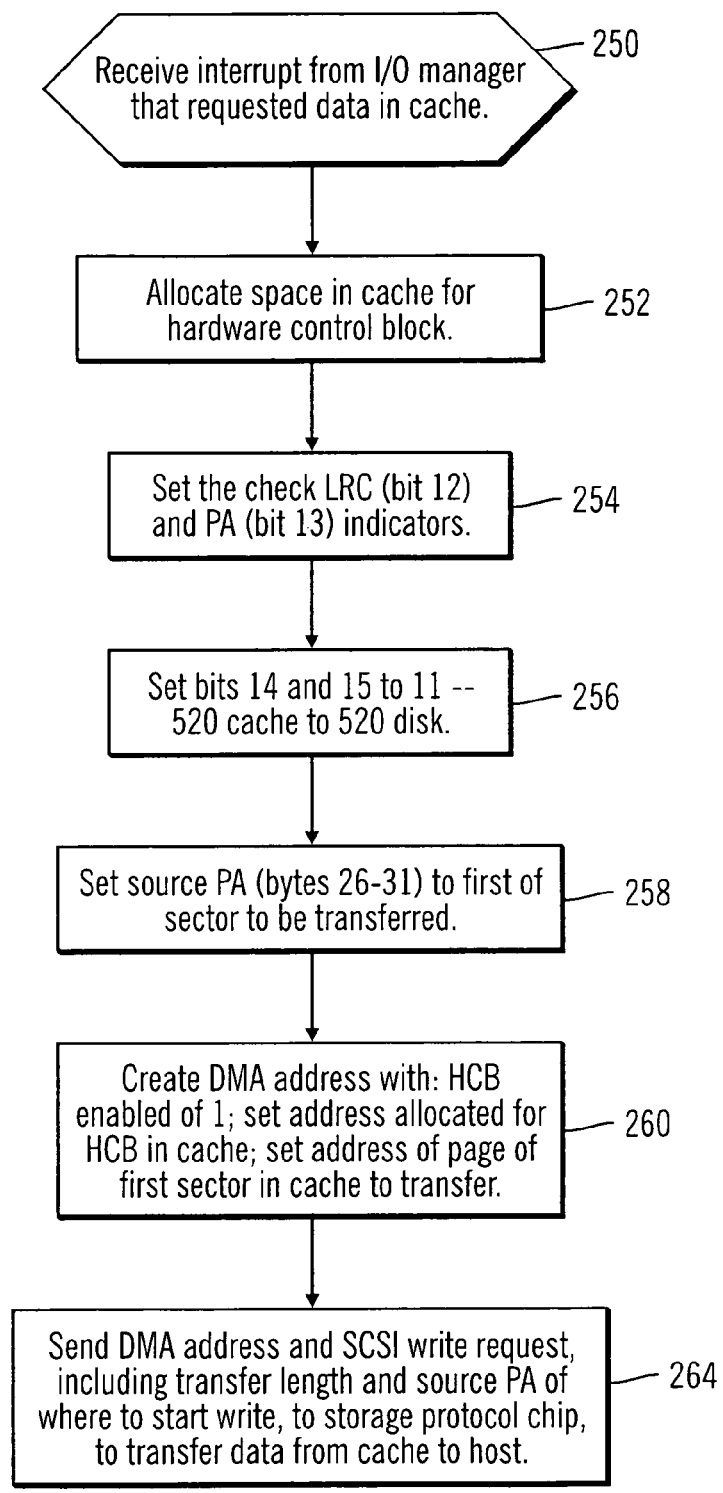
FIG. 7 illustrates logic to set-up an additional hardware control block to facilitate the transfer of the update from the cache to the storage device in accordance with preferred embodiments of the present invention.

FIG. 7 illustrates logic implemented in firmware or software of the processor 10 to set-up a hardware control block (HCB) and DMA address for use by the I/O manager 14 and storage protocol chip 32 to DMA the requested sectors from cache 12 to the storage device 6, again bypassing the main processor 10. With respect to FIG. 7, control begins at block 250 with the processor 10 receiving the interrupt from the I/O manager 14 that the updated sector(s) were written to cache 12. In response, the processor 10 allocates (at block 252) space in cache 12 for a new hardware control block (HCB) and sets (at block 254) the check LRC and physical address (PA) bits 12 and 13 "on" to check the data in cache 12 before it is written to the appropriate physical address (PA) in the storage device 6. The processor 10 then sets (at block 256) the address conversion bits 14–15 to "11", indicating that the 520 bytes in cache 12 are all stored in the storage device 6, i.e., the storage device 6 maintains the metadata.

The processor 10 then sets (at block 258) the source physical address (PA) bytes 26–31 in the hardware control block (HCB) to the physical address in the storage device 6 of the first sector to be updated from the data in the cache 12. The processor 10 further creates (at block 260) a DMA address with the memory select "on"; the hardware control block enabled to "on"; the hardware control block index indicating the location of the hardware control block for the transfer in cache 12; and the memory address in cache 12 where the first sector in the transfer is located. The processor 10 then transfers (at block 264) the DMA address and a SCSI write request indicating the transfer length of number of sectors n to transfer and the source physical address (PA) as the first sector to write to the storage protocol chip 32.

Figure 8:
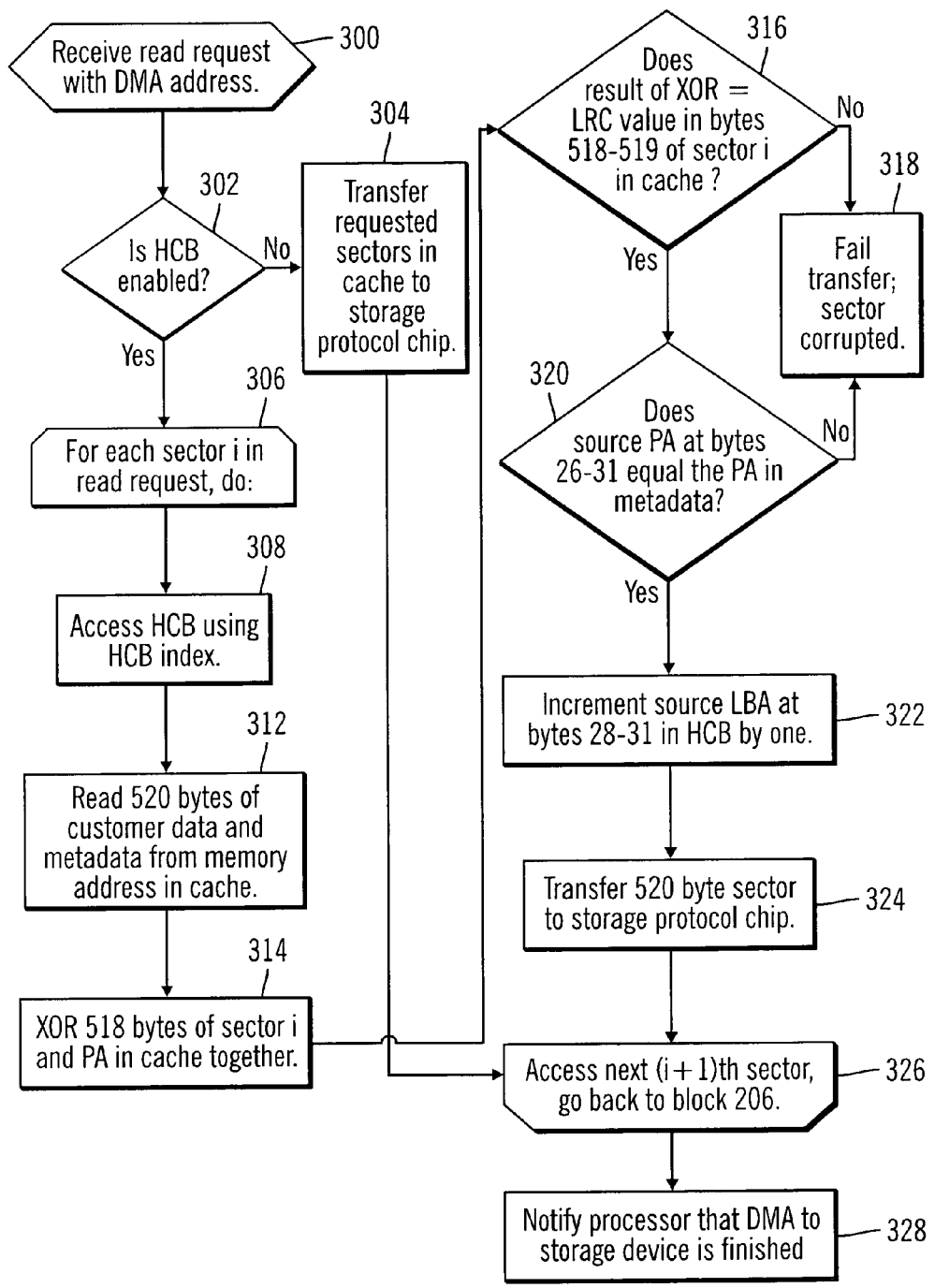
FIG. 8 illustrates logic to use the hardware control block set-up in FIG. 7 to transfer the update from the cache to the storage device in accordance with preferred embodiments of the present invention.

FIG. 8 illustrates logic implemented in the I/O manager 14 to process the write request and DMA address the storage protocol chip 32 asserts on the storage bus 22. If (at block 302) bit 62 of the DMA address indicates that the hardware control block (HCB) is not enabled, then the I/O manager 14 transfers (at block 304) the sectors in cache 12 at the memory address indicated at bits 32–0 in the DMA address to the storage protocol chip 32 to write to the storage device 6. Otherwise, if the hardware control block (HCB) is enabled, then the I/O manager 14 begins a loop at blocks 306 to 326 to transfer the requested sectors from cache 12 to the storage protocol chip 32. In this scenario, the address conversion bits 14–15 are "11", indicating that the 520 byte sector in cache 12 is written to the storage device 6, which stores all 520 bytes including the metadata. If the conversion bits 14–15 were "00", then there would be no metadata maintained in cache 12 for the sector.

Within the loop at block 308, the I/O manager 14 accesses the hardware control block (HCB) using the hardware control block (HCB) index in bits 61–64 of the DMA address. The I/O manager 14 further reads (at block 312) the 520 bytes of the customer data and metadata from the cache 12. The I/O manager 14 then XORs (at block 314) the 518 bytes of sector i data in cache 12 and compares (at block 316) the XOR value with the LRC bytes in the sector. If there is not a match, i.e., the residual is not zero, then the transfer is failed (at block 318). Otherwise if there is a match and the residual is zero, then the I/O manager 14 determines (at block 320) whether the source physical address (PA) at bytes 26–31 in the hardware control block (HCB) is the same as the physical address (PA) at bytes 512 to 517 in the metadata of the read sector i. If so, then the I/O manager 14 increments (at block 322) source LBA at bytes 28–31 in the hardware control block (HCB) by one and transfers (at block 324) the 520 bytes to the storage protocol chip 32. From blocks 304 to 324 control transfers to block 326 where the I/O manager 14 accesses the data for the next (i+1)th sector in cache 12 and goes back to block 306 to process the accessed data to check whether the data has been corrupted or inadvertently changed while in cache 12. Upon receiving the requested data from the I/O manager 14, the storage protocol chip 32 writes the data to the storage device 6. Further, the I/O manager 14 (at block 328) signals the processor 10 when all the data has been transferred from cache 12 to the storage protocol chip 32 that the update is complete.

Preferred embodiments provide a technique for maintaining metadata with a sector of data in cache 12 to use when transferring data from the cache 12 to the storage device 6 to update sectors in the storage device 6. The physical address (PA) and LRC metadata maintained with the sector in the cache 12 are used to determine whether the data has been inadvertently changed or corrupted while in storage and whether the sector from the storage device staged into the cache is the same data that the host 4 channel provided. This checking using the metadata ensures that updates written to the storage device 6 have not been corrupted while in cache 12. Thus, the storage device 6 can be assured that it is receiving the correct data.

Further, with the preferred embodiments, the error checking and data transfer operations are handled by the I/O manager 14 and not the processor 10. The processor 10 only has to set-up the hardware control block (HCB) and DMA memory address in cache 12, which the I/O manager 14 then uses to perform the error checking and data transfer operations. In this way, processor 10 performance is substantially improved because the processor is not burdened with the substantial processing task of transferring data and updating the metadata in cache, as well as performing the checking operations using the metadata.

The metadata maintained with the sectors in cache 12 can also be used in data error recovery operations. In further embodiments, a portion of the cache 12 may be backed-up by a battery to provide a non-volatile storage unit (NVS). To maximize the amount of customer data maintained and protected in NVS, in preferred embodiments, the cache 12 control data would be maintained in a volatile portion of the cache. As discussed cache control blocks, indicate for each location in cache, the disk ID and LBA of the location in the storage device 6 for the data in cache 12, state flags, command counters, references to valid and modified sector bitmaps, and list linkage pointers to the hash and LRU lists. In addition, the hash and LRU lists are maintained in the volatile portion of cache.

In preferred embodiments, the processor 10 further maintains valid/invalid and modified bitmaps indicating whether each sector in a page includes valid or invalid data and modified or unmodified data, respectively. These two bitmaps for each page are stored in the NVS portion of cache 12 and are used during error recovery operations. In this way, in the event of a power loss, all that is lost are the cache control blocks, which can be rebuilt from the eight bytes of metadata maintained with each sector in the NVS portion of cache and from the invalid/valid and modified/unmodified bitmaps.

Figure 9:
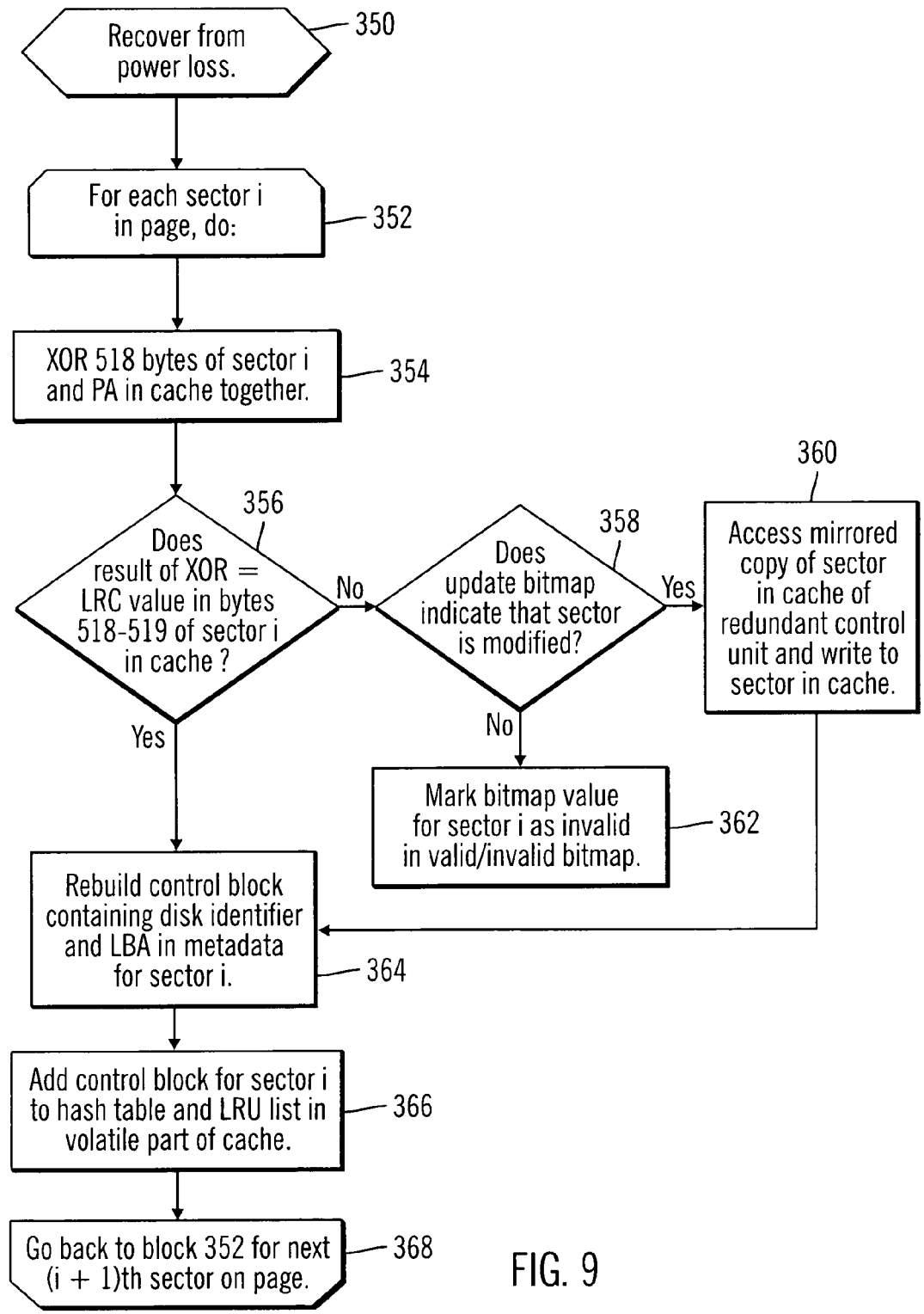
FIG. 9 illustrates logic to rebuild cache control blocks from the metadata in the event of a power loss in accordance with preferred embodiments of the present invention.

FIG. 9 illustrates logic implemented in the firmware and/or software of the processor 10 to recover from a power loss. Control begins at block 350 with the processor 10 initiating operations after recovering from a power loss. For each page in the NVS portion of cache, the processor 10 performs a loop at blocks 354 to 368 for each sector i in a page. Within this loop, the processor 10 first XORs (at block 354) the 518 bytes of sector i data in cache 12 and compares (at block 356) the XOR value with the LRC bytes in the sector. If there is not a match, i.e., the residual is not zero, then the data has changed in cache 12, and the current cached data is not valid. In such case, the processor 10 determines (at block 358) whether the update bitmap indicates that the sector includes modified data. If so, then the processor 10 accesses (at block 360) the updated data from a mirrored copy of the data in another cache managed by another storage controller maintaining copies of all updates to the cache 12. This update accessed from a dual cache would be written to the sector location in cache 12. The use of two storage controllers that maintain two copies of an update in different cache devices is known in the art. Further, if there is no additional storage controllers providing a mirror copy of the updates, the processor 10 may indicate the bad sectors in a data structure, such as a bitmap, in a manner known in the art. Otherwise, if (at block 358) the update bitmap indicates that sector i has not been modified, then the processor 10 marks (at block 362) the bitmap value for sector i as invalid as it does not contain valid data.

From block 360 or if the sector i has not been changed in cache 12 (the yes branch of block 356), control transfers to block 354 where the processor 10 rebuilds (at block 364) the control block for the sector i using the disk identifier and LBA address information maintained in the metadata (bytes 512–517) of the sector i. The processor 10 would then add (at block 366) the control block for sector i to a hash table and LRU list in the volatile part of cache.

The preferred embodiments maximize the amount of customer data that may be maintained in the NVS portion of cache 12 by storing control blocks and other related control information in the volatile portion of cache. To also allow for data recovery when maximizing the use of the NVS cache for customer data, preferred embodiments maintain 6 bytes of metadata with each sector of data in cache. Further, for each page in cache, two bitmaps are maintained in the NVS portion of cache including values for each sector in the page to indicate whether the sector is valid/invalid and modified/unmodified. This bitmap and metadata information maintained for each sector in the NVS portion of cache allows the cache control blocks to be rebuilt in case of a power loss when the control blocks are maintained in a volatile portion of cache in order to maximize the customer data that may be maintained in the NVS portion of cache.

CONCLUSION

The following describes some alternative embodiments for accomplishing the present invention.

The preferred embodiments may be implemented as a method, system, apparatus or program using standard programming and/or engineering techniques to produce software, firmware, hardware, or any combination thereof. The control logic for the I/O manager is implemented in logic circuits of an electronic device, such as an integrated circuit device. The control logic that causes the processor to perform various set-up operations is implemented in firmware of the storage controller processor. Further, the host and storage protocol chips are implemented in separate integrated circuit devices. In alternative embodiments, logic described herein as implemented in logic circuits may be implemented in firmware that controls a programmable device, such as a processor. Alternatively, logic described herein as implemented in firmware may be implemented as logic circuitry within an integrated circuit device.

The preferred logic of FIGS. 4–9 describe specific operations occurring in a particular order. In alternative embodiments, certain of the logic operations may be performed in a different order, modified or removed and still implement preferred embodiments of the present invention. Morever, steps may be added to the above described logic and still conform to the preferred embodiments. Further, operations described herein may occur sequentially or certain operations may be processed in parallel.

In preferred embodiments, data was transferred in sectors. In alternative embodiments, blocks of data may be transferred in storage units other than sectors.

In the described embodiments, the hardware control block and DMA memory address had particular fields at particular bit and byte locations. In alternative embodiments, different fields may be included in the hardware control block and DMA memory address and the described fields may be located at different byte and bit locations than described in the examples FIGS. 2–3.

Preferred embodiments were described with respect to a storage controller that interfaces between a host and the storage device. In alternative embodiments, the operations performed by the I/O manager and other components, such as the processor 10 and protocol chips 32 may be implemented in a computer system that interfaces with any type of storage device, such as one or more disk drives, a tape drive etc. In such case, the operations performed by the I/O manager 14 and protocol chips 30, 32 may be implemented in one or more hardware components in the computer separate from the main processor. Still further, in alternative embodiments any number of the I/O manager 10 and protocol chip 32 operations may be performed by the processor 10 to check data as it is being transferred form disk to cache and/or from cache to host.

In preferred embodiments, requested data was written into cache before being destaged to the storage device. In alternative embodiments, the data from the cache may be checked using the metadata and then the customer data portion, i.e., 512 bytes, would be transferred to the storage device.

In preferred embodiments, the requesting application was in a computer system remote from the storage controller. In alternative embodiments, the requesting application may comprise an application program executing in the computer system that performs the I/O manager operations of checking the metadata to determine whether data stored in the storage device and/or in cache has been inadvertently modified or corrupted.

In summary, preferred embodiments disclose a method, system, and data structures for updating data in a storage device. An update to one or more blocks of customer data at addresses in the storage device is received. For each block of data to update, metadata is generated indicating the address of the block in the storage device and an error checking code that is capable of being used to determine whether the customer data in the block has changed. For each block of data to update, the block of data to update and the metadata for the block are written to cache. Further, for each block of data to update, the block of data and the metadata are transferred for the block from the cache to the storage device.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.
**Enterprise Storage Server and ESCON are registered trademarks and Fibre Channel Raid Storage Controller is a trademark of IBM; Windows and Windows NT are registered trademarks of Microsoft Corporation.

What is claimed is:

1. A method for updating data in a storage device, comprising:
    receiving an update to one or more blocks of customer data at addresses in the storage device;
    for each block of data to update, generating metadata indicating the address of the block in the storage device and an error checking code that is capable of being used to determine whether the customer data in the block has changed;
    for each block of data to update, writing the block of data to update and the metadata for the block to cache;
    for each block of data to update, determining whether the address of the block of data in the metadata and the address in the storage device to update match;
    for each block of data to update, performing an operation on the customer data in the block and the error checking code to determine whether the customer data has changed; and
    transferring the block of data to update and metadata for the block to the storage device if the address of the block in the metadata and requested address match and the customer data has not changed.

2. The method of claim 1, wherein the operation performed on the customer data comprises XORing the customer data and wherein the error checking code comprises a longitudinal redundancy checking code.

3. The method of claim 1, wherein generating the metadata and determining whether the address of the block in the storage device and block address in metadata match and performing the operation on the customer data and error checking is performed by a device that is separate from a main processor, wherein the device transfers the block of data from the cache to the storage device using a direct memory access (DMA) channel.

4. The method of claim 1, further comprising:
setting up a control block in the cache including the block address of the block to update and an instruction to check the address and the error checking code of the block, wherein determining whether the block address in the metadata in the storage device and the block address to update match comprises using the block address in the control block in the cache as the block address to update to compare with the block address in the metadata stored with the block in the cache.

5. The method of claim 4, further comprising:
for each requested block, incrementing the block address in the control block after transferring the block from the cache to the storage device, wherein the incremented block address is used as the block address to compare with the block address in the metadata in the cache for the next requested block.

6. A method for updating data in a storage device, comprising:
receiving an update to one or more blocks of customer data at addresses in the storage device;
setting up a control block including the address of the block of data to update in the storage device and an instruction to generate the address and an error checking code as metadata for the block;
for each block of data to update, generating metadata indicating the address in the control block as the address of the block in the storage device to write and the error checking code that is capable of being used to determine whether the customer data in the block has changed;
for each block of data to update, writing the block of data to update and the metadata for the block to cache; and
for each block of data to update, transferring the block of data and the metadata for the block from the cache to the storage device.

7. The method of claim 6, further comprising:
for each block to update, incrementing the block address in the control block before processing a next block, wherein the incremented block address is used as the address in the storage device to generate as metadata for the next block of data to update.

8. The method of claim 6, wherein the error checking code is further capable of being used to determine whether the metadata in the block has changed.

9. A method for updating data in a storage device, comprising:
receiving an update to one or more blocks of customer data at addresses in the storage device;
for each block of data to update, generating metadata indicating the address of the block in the storage device and an error checking code, wherein the error checking code is generated by XORing the customer data in the block such that the error checking code comprises a longitudinal redundancy checking code, and wherein the error checking code is used to determine whether the customer data in the block has changed;
for each block of data to update, writing the block of data to update and the metadata for the block to cache; and
for each block of data to update, transferring the block of data and the metadata for the block from the cache to the storage device.

10. A method for updating data in a storage device, comprising:
receiving an update to one or more blocks of customer data at addresses in the storage device;
for each block of data to update, generating metadata indicating the address of the block in the storage device and an error checking code that is capable of being used to determine whether the customer data in the block has changed;
for each block of data to update, writing the block of data to update and the metadata for the block to cache;
for each block of data to update, transferring the block of data and the metadata for the block from the cache to the storage device;
recovering from a power loss; and
using the metadata for blocks in cache to rebuild cache control blocks for the blocks in cache after recovering from the power loss.

11. The method of claim 10, wherein the blocks of data and metadata are stored in a non-volatile portion of the cache and the cache control blocks are stored in a volatile portion of the cache.

12. The method of claim 10, further comprising:
maintaining a first data structure indicating whether each block of data in cache is valid or invalid and a second data structure indicating whether each block of data includes modified or unmodified data;
for each block of data in the cache, using the error checking code to determine whether the block of data in the cache has changed; and
for each block of data in the cache, indicating in the first data structure that the block of data is invalid if the second data structure indicates that the block of data is not modified and the block of data has changed.

13. The method of claim 10, further comprising:
maintaining a first data structure indicating whether each block of data in cache is valid or invalid and a second data structure indicating whether each block of data includes modified or unmodified data;
for each block of data in the cache, using the error checking code to determine whether the block of data in the cache has changed; and
for each block of data in the cache accessing the update to the block from another storage location if the second data structure indicates that the block of data is modified and the block of data has changed.

14. The method of claim 10, further comprising:
maintaining a first data structure indicating whether each block of data in cache is valid or invalid and a second data structure indicating whether each block of data includes modified or unmodified data;
for each block of data in the cache, using the error checking code to determine whether the block of data in the cache has changed; and
rebuilding the cache control block for the block using the address information in the metadata for the block if the block of data has not changed.

15. A system for updating data, comprising:
a storage device;
a cache;
means for receiving an update to one or more blocks of customer data at addresses in the storage device;
means for generating metadata, for each block of data to update, indicating the address of the block in the storage device and an error checking code that is capable of being used to determine whether the customer data in the block has changed;
means for writing the block of data to update and the metadata for the block to the cache for each block of data to update;
means for determining whether the address of the block of data in the metadata and the address in the storage device to update match for each block of data to update;

means for performing an operation on the customer data in the block and the error checking code to determine whether the customer data has changed for each block of data to update; and means for transferring the block of data to update and metadata for the block to the storage device if the address of the block in the metadata and requested address match and the customer data has not changed.

16. The system of claim 15, wherein the operation performed on the customer data comprises XORing the customer data and wherein the error checking code comprises a longitudinal redundancy checking code.

17. The system of claim 15, wherein the means for generating the metadata, determining whether the address of the block in the storage device and block address in metadata match, and performing the operation on the customer data and error checking comprises a device that is separate from a main processor, wherein the device transfers the block of data from the cache to the storage device using a direct memory access (DMA) channel.

18. The system of claim 15, further comprising:
means for setting up a control block in the cache including the block address of the block to update and an instruction to check the address and the error checking code of the block, wherein the means for determining whether the block address in the metadata in the storage device and the block address to update match comprises using the block address in the control block in the cache as the block address to update to compare with the block address in the metadata stored with the block in the cache.

19. The system of claim 18, further comprising:
means for incrementing the block address in the control block, for each requested block, after transferring the block from the cache to the storage device, wherein the incremented block address is used as the block address to compare with the block address in the metadata in the cache for the next requested block.

20. A system for updating data, comprising:
a storage device;
a cache;
means for receiving an update to one or more blocks of customer data at addresses in the storage device;
means for setting up a control block including the address of the block of data to update in the storage device and an instruction to generate the address and an error checking code as metadata for the block;
means for generating metadata, for each block of data to update, indicating the address in the control block as the address of the block in the storage device to write and the error checking code that is capable of being used to determine whether the customer data in the block has changed;
means for writing the block of data to update and the metadata for the block to the cache for each block of data to update; and
means transferring the block of data and the metadata for the block from the cache to the storage device for each block of data to update.

21. The system of claim 20, further comprising:
means for incrementing the block address in the control block, for each block to update, before processing a next block, wherein the incremented block address is used as the address in the storage device to generate as metadata for the next block of data to update.

22. The system of claim 20, further comprising means for using the error checking code to determine whether the metadata in the block has changed.

23. A system for updating data, comprising:
a storage device;
a cache;
means for receiving an update to one or more blocks of customer data at addresses in the storage device;
means for generating metadata, for each block of data to update, indicating the address of the block in the storage device and an error checking code, wherein the error checking code is generated by XORing the customer data in the block such that the error checking code comprises a longitudinal redundancy checking code, wherein the error checking code is used to determine whether the customer data in the block has changed;
means for writing the block of data to update and the metadata for the block to the cache for each block of data to update; and
means transferring the block of data and the metadata for the block from the cache to the storage device for each block of data to update.

24. A system for updating data, comprising:
a storage device;
a cache;
means for receiving an update to one or more blocks of customer data at addresses in the storage device;
means for generating metadata, for each block of data to update, indicating the address of the block in the storage device and an error checking code that is capable of being used to determine whether the customer data in the block has changed;
means for writing the block of data to update and the metadata for the block to the cache for each block of data to update;
means transferring the block of data and the metadata for the block from the cache to the storage device for each block of data to update;
means for recovering from a power loss; and
means for using the metadata for blocks in cache to rebuild cache control blocks for the blocks in cache after recovering from the power loss.

25. The system of claim 24, wherein the blocks of data and metadata are stored in a non-volatile portion of the cache and the cache control blocks are stored in a volatile portion of the cache.

26. The system of claim 24, further comprising:
means for maintaining a first data structure indicating whether each block of data in cache is valid or invalid and a second data structure indicating whether each block of data includes modified or unmodified data;
means for using the error checking code, for each block of data in the cache, to determine whether the block of data in the cache has changed; and
means for indicating in the first data structure, for each block of data in the cache, that the block of data is invalid if the second data structure indicates that the block of data is not modified and the block of data has changed.

27. The system of claim 24, further comprising:
means for maintaining a first data structure indicating whether each block of data in cache is valid or invalid and a second data structure indicating whether each block of data includes modified or unmodified data;
means for using the error checking code, for each block of data in the cache, to determine whether the block of data in the cache has changed; and
means for accessing, for each block of data in the cache, the update to the block from another storage location if the second data structure indicates that the block of data is modified and the block of data has changed.

28. The system of claim 24, further comprising:
means for maintaining a first data structure indicating whether each block of data in cache is valid or invalid and a second data structure indicating whether each block of data includes modified or unmodified data;
means for using the error checking code to determine whether the block of data in the cache has changed for each block of data in the cache; and
means for rebuilding the cache control block for the block using the address information in the metadata for the block if the block of data has not changed.

29. An integrated circuit device including logic for updating data in a storage device, wherein the integrated circuit device is in data communication with a cache, wherein the logic performs:
receiving an update to one or more blocks of customer data at addresses in the storage device;
for each block of data to update, generating metadata indicating the address of the block in the storage device and an error checking code that is capable of being used to determine whether the customer data in the block has changed;
for each block of data to update, writing the block of data to update and the metadata for the block to the cache;
for each block of data to update, determining whether the address of the block of data in the metadata and the address in the storage device to update match;
for each block of data to update, performing an operation on the customer data in the block and the error checking code to determine whether the customer data has changed; and
transferring the block of data to update and metadata for the block to the storage device if the address of the block in the metadata and requested address match and the customer data has not changed.

30. The integrated circuit device of claim 29, wherein the operation performed on the customer data comprises XORing the customer data and wherein the error checking code comprises a longitudinal redundancy checking code.

31. The integrated circuit device of claim 29, wherein the integrated circuit device is included in a storage system having a main processor, wherein the device transfers the block of data from the cache to the storage device using a direct memory access (DMA) channel.

32. The integrated circuit device of claim 29, wherein a processor generates a control block in the cache including the block address of the block to update and an instruction to cause the integrated circuit device to check the address and the error checking code of the block, wherein the integrated circuit device determines whether the block address in the metadata in the storage device and the block address to update match by using the block address in the control block in the cache as the block address to update to compare with the block address in the metadata stored with the block in the cache.

33. The integrated circuit device of claim 32, wherein the logic further performs:
for each requested block, incrementing the block address in the control block after transferring the block from the cache to the storage device, wherein the incremented block address is used as the block address to compare with the block address in the metadata in the cache for the next requested block.

34. An integrated circuit device including logic for updating data in a storage device, wherein the integrated circuit device is in data communication with a cache and processor, wherein the logic performs:
receiving an update to one or more blocks of customer data at addresses in the storage device;
accessing a control block, generated by the processor, including the address of the block of data to update in the storage device and an instruction to cause the integrated circuit device to generate the address and an error checking code as metadata for the block;
for each block of data to update, generating the metadata indicating the address in the control block as the address of the block in the storage device to write and the error checking code that is capable of being used to determine whether the customer data in the block has changed;
for each block of data to update, writing the block of data to update and the metadata for the block to the cache; and
for each block of data to update, transferring the block of data and the metadata for the block from the cache to the storage device.

35. The integrated circuit device of claim 34, wherein the logic further performs:
for each block to update, incrementing the block address in the control block before processing a next block, wherein the incremented block address is used as the address in the storage device to generate as metadata for the next block of data to update.

36. The integrated circuit device of claim 34, wherein the error checking code is further capable of being used to determine whether the metadata in the block has changed.

37. An integrated circuit device including logic for updating data in a storage device, wherein the integrated circuit device is in data communication with a cache, wherein the logic performs:
receiving an update to one or more blocks of customer data at addresses in the storage device;
for each block of data to update, generating metadata indicating the address of the block in the storage device and an error checking code, wherein the error checking code is generated by XORing the customer data in the block such that the error checking code comprises a longitudinal redundancy checking code, wherein the error checking code is used to determine whether the customer data in the block has changed;
for each block of data to update, writing the block of data to update and the metadata for the block to the cache; and
for each block of data to update, transferring the block of data and the metadata for the block from the cache to the storage device.

38. An integrated circuit device including logic for updating data in a storage device, wherein the integrated circuit device is in data communication with a cache, wherein the logic performs:
receiving an update to one or more blocks of customer data at addresses in the storage device;
for each block of data to update, generating metadata indicating the address of the block in the storage device and an error checking code that is capable of being used to determine whether the customer data in the block has changed;
for each block of data to update, writing the block of data to update and the metadata for the block to the cache;
for each block of data to update, transferring the block of data and the metadata for the block from the cache to the storage device;
recovering from a power loss; and
using the metadata for blocks in cache to rebuild cache control blocks for the blocks in cache after recovering from the power loss.

39. The integrated circuit device of claim 38, wherein the blocks of data and metadata are stored in a non-volatile portion of the cache and the cache control blocks are stored in a volatile portion of the cache.

40. A computer readable medium including at least one data structure used for updating data in a storage device and a cache, comprising:
   blocks of customer data;
   a block of metadata for each block of customer data, wherein the metadata includes the address of the block in the storage device and an error checking code that is capable of being used to determine whether the customer data in the block has changed while the block is in the cache, wherein a block of data to update and the metadata for the block are written to cache; and
   a control block including the address of the block of data to update in the storage device and an instruction to generate the address and the error checking code as metadata for the block, wherein generating the metadata indicating the address of the block in the storage device comprises using the block address in the control block as the address of the block in the storage device to write as the metadata.

41. The computer readable medium of claim 40, wherein the block address in the control block is incremented before processing a next block, wherein the incremented block address is used as the address in the storage device to generate as metadata for the next block of data to update.

42. A computer readable medium including at least one data structure used for updating data in a storage device and a cache, comprising:
   blocks of customer data;
   a control block in the cache including the block address of a block to update and an instruction to check the address and an error checking code of the block; and
   a block of metadata for each block of customer data, wherein the metadata includes the address of the block in the storage device and the error checking code, wherein the error checking code is generated from the customer data and used to determine whether the customer data in the block has changed, wherein the block address in the metadata in the storage device and the block address to update are determined to match by using the block address in the control block in the cache as the block address to update to compare with the block address in the metadata stored with the block in the cache; and
   wherein the block of data to update and the metadata for the block are written to cache.

43. The computer readable medium of claim 42, wherein the blocks of data and metadata are stored in a non-volatile portion of the cache and the cache control block is stored in a volatile portion of the cache.

44. A computer readable medium including at least one data structure used for updating data in a storage device and a cache, comprising:
   blocks of customer data;
   a block of metadata for each block of customer data, wherein the metadata includes the address of the block in the storage device and an error checking code, wherein the error checking code is generated from the customer data and used to determine whether the customer data in the block has changed, wherein the block of data to update and the metadata for the block are written to cache;
   a first data structure indicating whether each block of data in cache is valid or invalid; and
   a second data structure indicating whether each block of data includes modified or unmodified data, wherein the error checking code is used to determine whether each block of data in the cache has changed in the event of a data recovery event, wherein the first data structure is modified to indicate that a block of data is invalid if the second data structure indicates that the block of data is not modified and the block of data has changed.

* * * * *